United States Patent Office 3,697,248
Patented Oct. 10, 1972

3,697,248
RECOVERY OF SULPHUR DIOXIDE (SO₂) FROM GAS STREAMS AND PRECIPITATION OF ALUMINUM FLUORINE PRODUCT
Anson G. Betts, Plainfield, Mass.
(West Cummington, Mass. 01265)
No Drawing. Continuation-in-part of application Ser. No. 559,371, June 16, 1966, which is a continuation-in-part of application Ser. No. 361,207, Apr. 20, 1964, now abandoned, which is a continuation-in-part of application Ser. No. 153,741, Nov. 21 1961, now abandoned, which in turn is a continuation-in-part of application Ser. No. 768,554, Oct. 21, 1958, now abandoned. This application Dec. 31, 1970, Ser. No. 103,307
Int. Cl. C05b 11/14
U.S. Cl. 71—38                    7 Claims

ABSTRACT OF THE DISCLOSURE

In this invention a fluoriferous calcium phosphate mineral of the group which includes phosphate rock, apatite, aluminous phosphate, and a concentrate of any of them, suitably in finely-particled condition, is used in an aqueous suspension to combine with sulphur dioxide ($SO_2$) of a gas stream resulting from combustion of a sulphur-containing substance, for example, of coal or other fuel. The mixture is then reacted with aluminum compounds to precipitate an aluminum fluorine product from the fertilizer product.

---

This application is a continuation-in-part of application Ser. No. 559,371 filed June 16, 1966, which in turn is a continuation-in-part of application Ser. No. 361,207 filed Apr. 20, 1964, which latter said application is a continuation-in-part of application Ser. No. 153,741 filed Nov. 21, 1961, which in turn is a continuation-in-part of application Ser. No. 768,554 filed Oct. 21, 1958. The benefits of each of the aforesaid filing dates are claimed. The said applications Ser. Nos. 361,207; 153,741 and 768,554 are abandoned.

This invention relates to the recovery of sulphur dioxide ($SO_2$) from gas streams resulting from combustion of sulphur-containing substances.

In the practice of the invention there is used to combine with the $SO_2$ of the stream, a mineral of the group which includes fluoriferous calcium phosphate rock, apatite and aluminous phosphate, and concentrates thereof used in finely particled condition in an aqueous suspension containing a proportion of a reactable aluminum compound. The said mineral is decomposed and converted to a product mainly of solid calcium sulphite and dicalcium phosphate, derived from the used mineral substances and the $SO_2$ of the treated gas stream.

The said minerals contain fluorine and are too refractory for chemical decomposition by sulphurous acid. I discovered that if a suspension of finely-powdered phosphate rock and the like is chemically decomposable by sulphurous acid in the presence of a reactable aluminum compound. It appears that the chemical affinity of aluminum for fluorine energizes the desired reaction between fluoriferous phosphate rock and sulphurous acid.

Previously, sulphurous acid has not been successfully used to react chemically with fluoriferous phosphate rock and the like, as said rock is useless as absorber of and combinant with $SO_2$ of gas streams. I have discovered that the said rock and the like may be so decomposed and converted to a product mainly of artificial solid hydrated calcium phosphate and calcium sulphite if there be also used in the operation a reactable compound of aluminum.

The occurring chemical reaction in such treatment and recovery of $SO_2$ appears to be mostly according to $$Ca_3P_2O_8 + SO_2 + 7H_2O \rightarrow CaSO_3 \cdot 2H_2O + 2CaHPO_4 \cdot 2H_2O + H_2SO_3$$

The fluorine of the used mineral appears to enter into chemical combination with the provided and used aluminum both then existing in a solid compound intermingled with hydrated calcium sulphite and phosphate.

An example of the product is a novel agricultural superphosphate whereof the principal components are calcium sulphite and phosphate.

Objects of the invention include extraction and recovery of $SO_2$ from sulphurous gas streams from combustion furnaces with economic and other benefits offsetting the expenses of gas treatment: to utilize the good $SO_2$ absorption capabilities of aluminous substances especially of aluminum sulphite converted to aluminum persulphite, of aluminum hydroxide to form aluminum sulphite and persulphite, and of aluminates of calcium and of the common alkalies, sodium and potassium, to make a thorough abstraction of $SO_2$ from weak gas streams; and in the practice to take advantage of countercurrent flow of gas and absorbing medium for thorough and efficient absorption and recovery of $SO_2$.

The used aluminous substance is preferably selected from the group which includes, but without limitation, aluminum hydroxide, sulphate, sulphite, chloride and basic chloride and the aluminates of the common alkali metals. It is advantageous to utilize both an aluminum salt, for example aluminum sulphate, and an aluminate, for example crude sodium aluminate, according to, for example $$Al_2(SO_4)_3 + 6NaAlO_2 + 12H_2O \rightarrow 3Na_2SO_4 + 8Al(OH)_3$$

In the practice there may be used an amount of aluminum compound containing 9.5 to 38 parts of aluminum by weight for each 19 parts of fluorine introduced in the phosphate mineral. But instead of relying solely on a chemical calculation, it is preferred to adjust to the most favorable proportion of aluminum by actual tests with the materials to be used in the practice.

The least proportional use of aluminum (element) for such use is one-half part of aluminum for each part of fluorine contained in the used amount of the phosphate mineral.

The fluorine of the used phosphate mineral appears to enter into chemical combination with the aluminum of the provided aluminum compound both then existing in a solid compound intermingled with the solid sulphite-and-phosphate product.

The used phosphate rock etc. should be very finely powdered and may be well used in an aqueous suspension or slurry against which the $SO_2$-containing gas is passed in any suitable known equipment and preferably in a counter-current system.

The used medium of $SO_2$ absorption may be initially of water, solution of a selected aluminum compound, or a suspension of aluminum hydroxide or of a low-cost aluminate of calcium or of a common alkali metal, sodium, potassium, procurable by reacting high-alumina clay, bauxite, coal ash etc. with a basic substance of the group consisting of lime, soda, etc.

The phosphate mineral may be introduced into the absorbing medium either initially or subsequent to the conversion of the aluminum compound partly or wholly to an aluminum sulphite.

In the extraction and recovery of $SO_2$ from a gas stream it is preferred to use a counter-current system and apparatus wherein the gas stream being cleaned of $SO_2$ is discharged against an entering medium of absorption of high $SO_2$ absorption capability provided by a content in the medium of an active absorbent of the group consisting of aluminum hydroxide and of an aluminate of the said group of aluminates.

In the practice combining recovery of the $SO_2$ of the gas streams with utilization of phosphate rock and the like converted to a more useful and advantageous product of phosphorus, the use of an aluminous substance as a component of a gas-treating medium is plurally useful and beneficial in that—(1) its use enables improved sulphite built-up concentration in the used medium, (2) because of the chemical affinity of aluminum of the medium and fluorine of the phosphate rock, its use energizes the chemical decomposition of the refractory fluoriferous calcium phosphate of the rock, (3) its said use optionally enables the production and recovery of a valuable by-product containing aluminum and fluorine, and (4) its said use tends to prevent the corrosive and nuisance-creating effects of fluorine acids heretofore liberated in aicd treatments of phosphate rock, and (5) the use of a reactable aluminum compound of an alkaline reaction when wetted, such as an aluminate, or aluminum hydroxide, which possesses high $SO_2$ absorbing capability, provides further novelty and utility as set forth in the next-below.

In the use of an absorption medium containing an aluminate of alkaline reaction when wetted, and in an absorption train having a counter-current system in which the gas stream is passed oppositely to the flow of the medium, there is enabled a much better percentage of $SO_2$ condensation and cleaning of the gas stream.

Any known absorption system and apparatus for gas washing, scrubbing, tower absorption, percolating, gas injection etc. may be used in the gas cleaning treatment.

The so-used aluminous substance may be introduced into the absorbing medium either in dissolved or directly soluble form such as use of aluminum sulphate, aluminum sulphite or persulphite, or in a form dissoluble in the medium in presence of sulphurous acid, as in the use of aluminum hydroxide, aluminum phosphate mineral or a crude solid aluminate of calcium, sodium or potassium prepared from clay, bauxite, high-alumine coal ash, etc. by a treatment thereof with lime, soda, etc.

In a mode of practice of the invention, the used phosphate rock, preferably pre-calcined to oxidize and remove its refractory carbonaceous component, and as finely pulverized as commercially practicable, may optionally be introduced and used as an original constituent of the aluminum-containing medium used for absorption of $SO_2$ from a gas stream according to option A or under option B the medium containing the aluminous substance but less or no phosphate rock, may be used as absorbent of $SO_2$ with the dissolved $SO_2$ entering into chemical combination with the aluminous constituent as dissolved aluminum sulphite or persulphite. (By the term "aluminum persulphite" is meant a sulphite of aluminum containing proportionally more $SO_2$ than is contained in aluminum sulphite $Al_2(SO_3)_3$.)

In use of option B, solution of sodium aluminate (or its quivalent, a mix of water and powdered crude aluminate of a common base, of the group consisting of soda, lime and potash), may be used as the fluid medium of absorption of $SO_2$, yielding solution containing aluminum sulphite or persulphite, and the selected proportion of phosphate rock is subsequently added, and the whole maintained and digested for completion of the chemical decomposition of the phosphate rock. The following equation is explanatory $$2AlNaO_2 + 8SO_2 + 2H_2O = 2NaHSO_3 + Al_2O_3 \cdot 5SO_2 + H_2SO_3$$

For a more complete chemical conversion of the components of the resulting medium, concentrated $SO_2$ may then be injected into the phosphorus-containing medium under pressure.

The crude product of use of phosphate rock in absorbing $SO_2$ from a gas stream, under either option A or option B is a suspension of solids including calcium sulphite, artificial calcium phosphate and aluminum-fluorine compound, in water or in solution containing sulphurous acid. If there be used $SO_2$ which has been compressed, the product may then contain a soluble calcium phosphate but with use of $SO_2$ which has not been compressed, the amount of calcium phosphate dissolved in the medium, is very little, or none.

Options A and B may be both used in parts.

For purposes of explanation of conversion of phosphate rock by use of sulphurous acid, assuming for the sake of simplicity that the phosphate rock is chemically representable according to the formula $$CaCO_3 + 2Ca_3P_2O_8 + CaF_2$$

the following is explanatory $$2(2Ca_3P_2O_8 + CaCO_3 + CaF_2) + Al_2O_3 \cdot 5SO_2 + 3H_2SO_3 + 2H_2O \rightarrow 8CaHPO_4 + 8CaSO_3 + 2CO_2 + 2AlF_2OH$$

The mass of solids separated from the resulting suspension, constitutes as example of a new agricultural superphosphate.

By the term "superphosphate" is meant a mass of solids containing an artificial calcium phosphate, a salt of calcium of an acid of an oxide of sulphur and non-phosphoric solid constituents characteristically contained in phosphate rocks, of the group consisting of sand, clay, etc.

An advantage under option B is the use of a medium physically unburdened by a heavy content of phosphate rock.

In examples, absorbing $SO_2$ from a gas stream, there is used as medium of absorption, a fluid suspension made from 100 parts of finely powdered phosphate rock of grade commonly selected for chemical conversion to a superphosphate or to solution of phosphoric acid, 225 parts of water, and chemically reactive aluminum hydroxide in the amount containing 7 parts of $Al_2O_3$. The medium is used in absorbing $SO_2$ from a gas stream containing $SO_2$. There is absorbed 21 or more parts of $SO_2$, by weight.

After digestion of the resulting medium, with prevention of stratification during the digestion, for sufficient time to substantially complete the decomposition of the phosphate rock, the solids may be separated and recovered as a superphosphate product. Or, the product of the aforesaid absorption may be then treated for chemical transformation into products of phosphorus, sulphur and together-combined aluminum and fluorine with acidic substance selected from the group which comprises concentrated $SO_2$ applied under pressure, sulphuric acid, chlorine, nitric acid, nitric and sulphuric acids, and phosphoric acid.

Example 1.—In production of a novel crude agricultural superphosphate essentially composed of calcium sulphite, dicalcium phosphate, an aluminum and fluorine compound and silicious components of phosphate rock, there is used as medium of absorption of $SO_2$ from a gas stream an aqueous suspension composed of 100 parts of finely powdered precalcined phosphate rock of chemical-grade quality, the amount of aluminum sulphate which contains 1 part of aluminum (element) and the amount of sodium aluminate $NaAlO_2$ which contains about 3 parts of aluminum (element) and 200 parts of water. More than 20 parts of $SO_2$ by weight are absorbed. The resulting product of absorption is digested with heating in a closed container preventive of escape of $SO_2$ converting the mass to a suspension of solids separated and recovered as a novel agricultural superphosphate.

In this example reactive aluminum hydroxide is provided from use of both aluminum sulphate and alkali metal aluminate as explained by $$Al_2(SO_4)_3 + 6NaAlO_2 + 12H_2O = 3Na_2SO_4 + 8Al(OH)_3$$

Example 2.—Under option B, solution of sodium aluminate, or as an equivalent, water and powdered crude sodium aluminate, or as another equivalent, water and aluminum hydroxide, is used as a fluid medium for absorption of SO₂ from a sulphurous gas stream, producing solution of aluminum persulphite, or of aluminum and sodium persulphites, as illustrated by

$$2NaAlO_2 + 8SO_2 + 2H_2O = 2NaHSO_3 + Al_2O_3 \cdot 5SO_2 + H_2SO_3$$

To the resulting persulphite medium preferably containing some free sulphurous acid the selected proportion of pulverized phosphate rock is then added, and the whole maintained and digested for completion of the chemical reaction of its constituents. The whole may be digested with heating, or with heating in a close pressure-resisting container to prevent escape of SO₂, to hasten completion of chemical reaction of its constituents.

The resultant medium is a suspension of solids including calcium sulphite, artificial calcium phosphate and aluminum-fluorine compound in water, weak solution or solution containing sulphurous acid, from which the solids are recovered as a product.

The product of absorption of SO₂ in an aqueous medium wherein phosphate rock is used to result in the formation of calcium sulphite from the SO₂ and calcium of the rock and in formation of a solid artificial calcium phosphate both then existing as the principal constituents of the converted medium, may then be converted to a more-finished product by treatment with an acidic substance of the group which comprises concentrated SO₂ gas applied under pressure, sulphuric acid, chlorine, nitric acid, and phosphoric acid.

Example 3.—The product of use of an aqueous medium provided with phosphate rock and used to absorb gaseous SO₂ from a gas stream according to the foregoing descriptions, with or without removal of its water or weak solution constituent, is placed in a pressure-resisting container and concentrated SO₂ is injected under pressure effecting decomposition of the dicalcium phosphate constituent as shown by

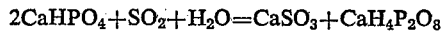

$$2CaHPO_4 + SO_2 + H_2O = CaSO_3 + CaH_4P_2O_8$$

The resulting solution of monocalcium phosphate and sulphurous acid is separated from undissolved calcium sulphite and other solids, and recovered as a product.

Example 4.—In production of solution of phosphoric acid as one product, and concentrated SO₂ as another product, from the medium which has been used to absorb SO₂ from a gas stream according to the above description, to the medium there is added the amount of sulphuric acid which suffices to convert the calcium of the medium to calcium sulphate and the phosphorus to phosphoric acid, expelling concentrated SO₂ gas as a product condensible to liquefied SO₂ as a product. The resulting solution of phosphoric acid is separated from the resultant solid calcium sulphate and the said solution recovered as a product.

Example 5.—To extract SO₂ from a gas stream there is used an aqueous medium using 100 parts of phosphate rock and the amount of a reactable aluminum compound containing 3 parts of aluminum (element)+21 parts of SO₂ are absorbed.

In this example, to obtain solution of phosphoric acid as one product and gaseous oxide of nitrogen as another product utilizing the reaction

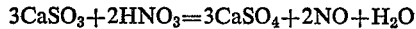

$$3CaSO_3 + 2HNO_3 = 3CaSO_4 + 2NO + H_2O$$

there is added to the mass resulting from the absorption of SO₂ the amount of nitric acid which contains 14 parts of HNO₃ and the amount of sulphuric acid required to convert the remaining calcium of the mass to calcium sulphate, recovering gaseous oxide of nitrogen as a product and solution of phosphoric acid separated from the calcium sulphate, as a product.

Example 6.—This example differs from Example 5 in that to the mass resulting from the SO₂ absorption there is added the amount of nitric acid which contains 87 parts of HNO₃ and the resulting solution separated from the calcium sulphate is solution of calcium nitrate and phosphoric acid.

Example 7.—An absorbing medium prepared from 100 parts of pre-calcined chemical grade very finely ground phosphate rock, 150 parts of water, the amount of aluminum sulphate which contains ¾ part of aluminum (element) and the amount of crude sodium aluminate NaAlO₂ which contains 2¼ part of aluminum (element) is used to absorb 24 parts of SO₂ from a gas stream. To the resulting mass there is introduced the amount of chlorine required to convert the sulphite constituency of the medium to the respective sulphate constituency, the amount being not more than 27 parts of chlorine, thereby effecting the conversion mainly according to

$$CaSO_3 + CaHPO_4 + 2Cl + H_2O = CaSO_4 + CaCl_2 + H_3PO_4$$

The solution produced mainly of phosphoric acid and calcium chloride is separated from the calcium sulphate and recovered as a product.

In the claims the term "phosphate rock" is meant to include phosphate rock, mineral mostly of apatite, and aluminum calcium phosphate mineral whether or not concentrated, and whether or not pre-calcined to remove the fossil glue constituent.

I claim:

1. In the utilization of a sulphurous gas stream from combustion of a sulphur-containing substance using fluoriferous calcium phosphate rock to supply oxide of calcium as a combinant of SO₂ of said stream and to obtain a composition of solid calcium sulphite and of solid artificial calcium phosphate and of an aluminum-fluoride compound, the process which comprises contacting said stream with a fluid aqueous medium containing chemically reactable compound of aluminum selected from the group consisting of aluminum hydroxide, sulphate, sulphite, persulphite, phosphate chloride, and aluminate of a common mineral base, used within the proportion to provide between one-half and two parts of reactable aluminum by weight for each part of fluorine contained in the used portion of said rock, therewith absorbing SO₂ of said stream into a resulting sulphurous medium and reacting a resulting acidic component of the medium with said rock whereby ingredients of said rock and of the used medium are converted to ingredients of a wetted composition essentially of (1) solid calcium sulphite, (2) of artificial solid calcium phosphate and (3) of aluminum-fluoride compound recovered as a product.

2. In the recovery of SO₂ from a gas stream resulting from combustion of a sulphur-containing substance, the process which comprises absorbing said SO₂ in a fluid medium composed essentially of (1) an aqueous fluid, (2) of pulverized phosphate rock and, (3) of a reactable compound of aluminum selected from the group consisting of aluminum hydroxide, sulphate, sulphite, persulphite, phosphate, chloride and aluminate of common mineral base from the group consisting of soda, lime and potash used within the proportion to provide between one-half and two parts of reactable aluminum by weight for each part of fluorine contained in the used portion of said rock thereby absorbing SO₂ of said stream into a resulting aqueous composition essentially of (1) solid calcium sulphite, (2) of dicalcium phosphate and (3) of an aluminum-fluorine compound and recovering the said composition as a product.

3. The process of claim 1 wherein its said produced wetted composition is further treated with an acidic substance selected from the group consisting of sulphurous acid applied under pressure, sulphuric acid, nitric acid and chlorine with the result of solubilizing the phosphoric component of said wetted composition.

4. The process according to claim 3 wherein the used selected acidic substance is sulphuric acid used in the proportion to convert the phosphoric constituent of said wetted composition to phosphoric acid.

5. The process of claim 3 wherein the selected used acidic substance is nitric acid used in the proportion to produce solution of calcium nitrate and a dissolved acidic compound of phosphorus from the said wetted composition.

6. The process according to claim 3 wherein the selected acidic substance is chlorine used in the proportion to convert the phosphorus of the artificial solid calcium phosphate of the said wetted composition to phosphoric acid.

7. The process according to claim 3 wherein the selected used acidic substance is sulphurous acid applied under pressure in the amount to convert the dicalcium phosphate of said wetted composition to dissolved monocalcium phosphate.

References Cited
UNITED STATES PATENTS

| | | | |
|---|---|---|---|
| 2,879,152 | 3/1959 | Coleman | 71—39 X |
| 2,874,036 | 2/1959 | Datin | 71—39 X |
| 2,899,293 | 8/1959 | Munekata | 71—39 X |
| 3,241,944 | 3/1966 | Takeda et al. | 71—37 |
| 2,173,877 | 9/1939 | Clark et al. | 23—2 SQ |
| 3,298,781 | 1/1967 | Fukuma et al. | 23—2 SQ |
| 1,246,636 | 11/1917 | Meyers | 71—38 |
| 1,251,741 | 1/1918 | Blumenberg | 71—38 X |
| 1,326,533 | 12/1919 | Sadtler | 71—38 |
| 1,850,017 | 3/1932 | Lehreke | 23—88 |
| 2,783,140 | 2/1957 | Hignett et al. | 71—37 |
| 2,976,141 | 3/1961 | Carothers et al. | 71—40 |
| 2,769,703 | 11/1956 | Andrés et al. | 71—37 X |
| 1,819,464 | 8/1931 | Holz | 71—38 X |

REUBEN FRIEDMAN, Primary Examiner

R. BARNES, Assistant Examiner

U.S. Cl. X.R.

23—88